(12) United States Patent
Engelhardt

(10) Patent No.: US 6,355,919 B1
(45) Date of Patent: Mar. 12, 2002

(54) CONFOCAL LASER SCANNING MICROSCOPE, CALIBRATION UNIT FOR A CONFOCAL LASER SCANNING MICROSCOPE AND METHOD FOR CALIBRATING A CONFOCAL LASER SCANNING MICROSCOPE

(75) Inventor: Johann Engelhardt, Bad Schoenborn (DE)

(73) Assignee: Leica Microsystems Heidelberg GmbH, Heidelberg (DE)

(*) Notice: Subject to any disclaimer, the term of this patent is extended or adjusted under 35 U.S.C. 154(b) by 0 days.

(21) Appl. No.: 09/402,935
(22) PCT Filed: Feb. 22, 1999
(86) PCT No.: PCT/DE99/00480
  § 371 Date: Oct. 14, 1999
  § 102(e) Date: Oct. 14, 1999
(87) PCT Pub. No.: WO99/42885
  PCT Pub. Date: Aug. 26, 1999

(30) Foreign Application Priority Data

Feb. 20, 1998 (DE) .......................... 198 07 072

(51) Int. Cl.[7] ................................ G02B 7/04
(52) U.S. Cl. .................. 250/201.3; 250/235; 250/559.1
(58) Field of Search ........................... 250/201.3, 201.5, 250/234, 235, 216, 559.1; 359/209–216

(56) References Cited

U.S. PATENT DOCUMENTS

| 4,796,038 A | * | 1/1989 | Allen et al. ................ 396/548 |
| 4,861,982 A | | 8/1989 | Smid et al. ................ 250/235 |
| 4,959,552 A | * | 9/1990 | Saffert et al. ............ 250/201.3 |

FOREIGN PATENT DOCUMENTS

| EP | 0 230 578 | 8/1987 |
| EP | 0 380 904 | 8/1990 |
| EP | 0 564 178 | 10/1993 |

* cited by examiner

Primary Examiner—Que T. Le
(74) Attorney, Agent, or Firm—Foley & Lardner

(57) ABSTRACT

For the purpose of calibration which is simple and can also be carried out as often as desired, an arrangement and a method for calibrating a preferably confocal laser scanning microscope, it being possible for an object (1) to be scanned by a scanning beam (2), are defined by calibration means (12) which are arranged in the plane of an intermediate image (11) and can likewise be scanned by the scanning beam (2).

49 Claims, 1 Drawing Sheet

CONFOCAL LASER SCANNING MICROSCOPE, CALIBRATION UNIT FOR A CONFOCAL LASER SCANNING MICROSCOPE AND METHOD FOR CALIBRATING A CONFOCAL LASER SCANNING MICROSCOPE

BACKGROUND

The invention relates to an arrangement for calibrating a preferably confocal laser scanning microscope, it being possible for an object to be scanned by a scanning beam. The invention also relates to a corresponding method.

RELATED ART

Laser scanning microscopes, but also in particular confocal laser scanning microscopes, are being applied ever more often to present microscopic objects. Because of the confocal arrangement, such systems are particularly well suited to three-dimensional images of structures, and lead to unusually good image qualities, particularly in the case of fluorescence photographs of thick samples. However, when such systems are used for quantitative analyses, very substantial difficulties arise in calibrating the systems, specifically mostly whenever absolute intensities are to be measured.

The intensity of a laser can usually be modified by setting the tube current over a certain range. In the case of multiline lasers and mixed gas lasers, the mutual intensity ratios of the lines can, moreover, vary. Finally, with all lasers there are slow variations in the intensity (drift) and rapid variations in intensity (noise, humming, mode fluctuations). Automatic light control of the laser leads as a rule to shortened service lives, specifically when maladjustments occur which are, in turn, compensated by a higher current.

A further problem arises as follows. The pupillary aperture of objectives is of varying magnitude. However, since these are to be overilluminated by the beam, in order to achieve a high resolution of the microscope which is limited by defraction it is necessary for light quantities of the expanded laser which are of varying magnitude depending on the objective to reach the sample.

The confocal pinhole in front of the detector or detectors is normally to be of micromechanical design, and needs a magnitude calibration. The effect of the pinhole in "cutting out" a part of the point spread function depends however, in turn, on the respective enlargement.

Photomultipliers are normally used as detectors in the case of confocal laser scanning microscopes. Because of the high dynamics of the signals that are to be measured, the high voltage is normally used for gain adjustment via the dynodes of the photomultiplier. Whereas for a specific high voltage the output signal of a PMT is a linear function of the input intensity, the gain in the PSI depends nonlinearly on the high voltage, and varies strongly individually.

A further problem resides in that a monomode optical fiber can select different laser modes, as a result of which mode fluctuations of the laser can lead to intensity fluctuations. Retroreflections in the lasers can disturb the internal laser control mechanisms, and thus lead to intensity fluctuations.

Finally, during rapid scanning of the beam with mirrors, inertial forces and control imperfections lead to deviations of the scanning beam from the desired path, specifically for the most rapidly scanned coordinates, in particular.

For practical reasons it is extremely complicated individually to correct and calibrate the participating components of the system.

SUMMARY OF INVENTION

It is the object of the invention to specify an arrangement for calibrating a preferably confocal laser scanning microscope, which permits all the components to be calibrated using simple means, the aim being for automatic calibration to be possible. A corresponding method is also to be specified.

The arrangement according to the invention and of the generic type achieves the object above by means of the features of patent claim 1. According to this, the generic arrangement for calibrating a preferably confocal laser microscope is defined by calibration means which are arranged in the plane of an intermediate image and can likewise be scanned by the scanning beam.

According to the invention, it has become known that there is no sense in individually correcting and calibrating all the components of the system. Now then, it is possible using simple means to be able to calibrate a system of all or a multiplicity of the components simultaneously, in which case brightness fluctuations in the light source can be taken into account during detection. Such a calibration is possible by virtue of the fact that arranged in the plane of an intermediate image are appropriate calibration means which—like the object—can likewise be started or scanned by the scanning beam. Calibration is thereby possible during the actual recording and before and/or after scanning of the object.

In a particularly advantageous way, the calibration means can be pivoted into the region of the image field in the plane of the intermediate image. To this extent, the calibration means are put at the location of the intermediate image—into the image field. However, it is likewise also conceivable that the calibration means are arranged at the edge of the intermediate image outside the actual image field, it being possible for such an arrangement to be stationary. Mechanisms for moving the calibration means are not required in this case, with the result that this is a particularly simple configuration of the teaching according to the invention.

Calibration means can be measuring means, on the one hand, and reference structures, on the other hand, depending on which components are to be calibrated. In turn, as measuring means, consideration is given to the detection means which serve the purpose of measuring laser power and laser calibration. In concrete terms, the detection means can be photodiodes.

If the calibration means are reference structures, a multiplicity of different structures are available—depending on the component to be calibrated. Thus, the reference structures can, for example, be designed as gratings which serve the purpose of calibrating image size and/or calibrating linearity.

It is likewise conceivable that the reference structures are designed as lines which, in turn, can serve the purpose of calibrating image position.

Fundamentally, the reference structures can be designed within the scope of a further embodiment as preferably flat patterns which serve the purpose of calibrating the phase of the outward and return movements of the scanner or scanning beam.

The reference structures can likewise be three-dimensional structures which serve the purpose of calibrating the optical system and/or the pinhole position. The three-dimensional structures (3-D structures) can be steps, recesses or the like.

It is possible within the scope of a further embodiment of the reference structures for the latter to be constructed to be active, for example as luminous means which serve the purpose of calibrating the detectors. The luminous means can, in turn, have different spectra, it being possible in concrete terms for the luminous means to be light-emitting diodes.

Finally, it is possible that the reference structures are designed an means exhibiting interactions with the scanning beam, such means preferably being known reflecting, absorbing, fluorescing or polarizing means.

With regard to the arrangement of the calibration means—measuring means and/or reference structures—it is advantageous for these to be arranged in matrix form or meandering form. For this purpose, the calibration means can be arranged and/or constructed on a calibration template. The calibration template could be a precision board with etched structures. The board itself could, in turn, be designed as an epoxy resin plate, specifically preferably with a gold coating, in order to prevent long-term changes.

With regard to a stationary arrangement of the calibration template, in particular, it is further advantageous when the latter has a cutout corresponding to the size of the image field and through which the scanning beam can pass unhindered to the normal image. The calibration means are appropriately arranged in this case at the edge of the calibration template. The cutout could be of round or square design. Correspondingly, the calibration template could have a preferably stationary circular ring surface carrying the calibration means or—within the scope of a square construction of the calibration template—a frame-like surface, the calibration means being carried by the frame limbs.

It is likewise conceivable to design the calibration template as a disk which can be swiveled into the beam path of the scanning beam, such a refinement necessitating an appropriate mechanism for swiveling the calibration template.

For the purpose of optimum calibration of the components, the calibration template should be arranged as close as possible to the object to be scanned. In a very particularly advantageous way, the calibration template is arranged directly on or in front of the object to be scanned.

With regard to the method according to the invention, the previously named object is achieved by means of the features of patent claim 28. According to this, a method of a generic type is defined in that calibration means arranged in the plane of an intermediate image are scanned by the scanning beam, specifically independently of whether the calibration means are located continuously in the plane of the intermediate image or are swiveled in for the purpose of calibration. If the calibration means are stationary calibration means, the latter are arranged at the edge of the intermediate image outside the actual image field and are also scanned there—outside the actual image field.

The calibration can be performed manually or automatically. It is also conceivable to undertake the calibration directly after switching on the laser light source. However, it is likewise also possible for the calibration to be carried out before and/or after scanning the object or recording the image, specifically likewise manually or automatically.

Finally, the calibration could be used for automatic data correction, in which case the calibration data, on the one hand, and the measured values, on the other hand, are to be fed to a computer and processed there.

There are various possibilities for advantageously refining and developing the teaching of the present invention. Reference may be made, for this purpose, to the features described herein, on the one hand, and to the following explanation of an exemplary embodiment of the invention with the aid of the drawing, on the other hand. In conjunction with the explanation of the preferred exemplary embodiment of the invention, an explanation is also given of generally preferred refinements and developments of the teaching.

BRIEF DESCRIPTION OF THE DRAWING

In the drawing:

the sole figure shows,in a diagrammatic representation, the principle of the arrangement of a confocal laser scanning microscope, with an indicated intermediate image.

DETAILED DESCRIPTION OF THE EXEMPLARY EMBODIMENT

Figure 1:
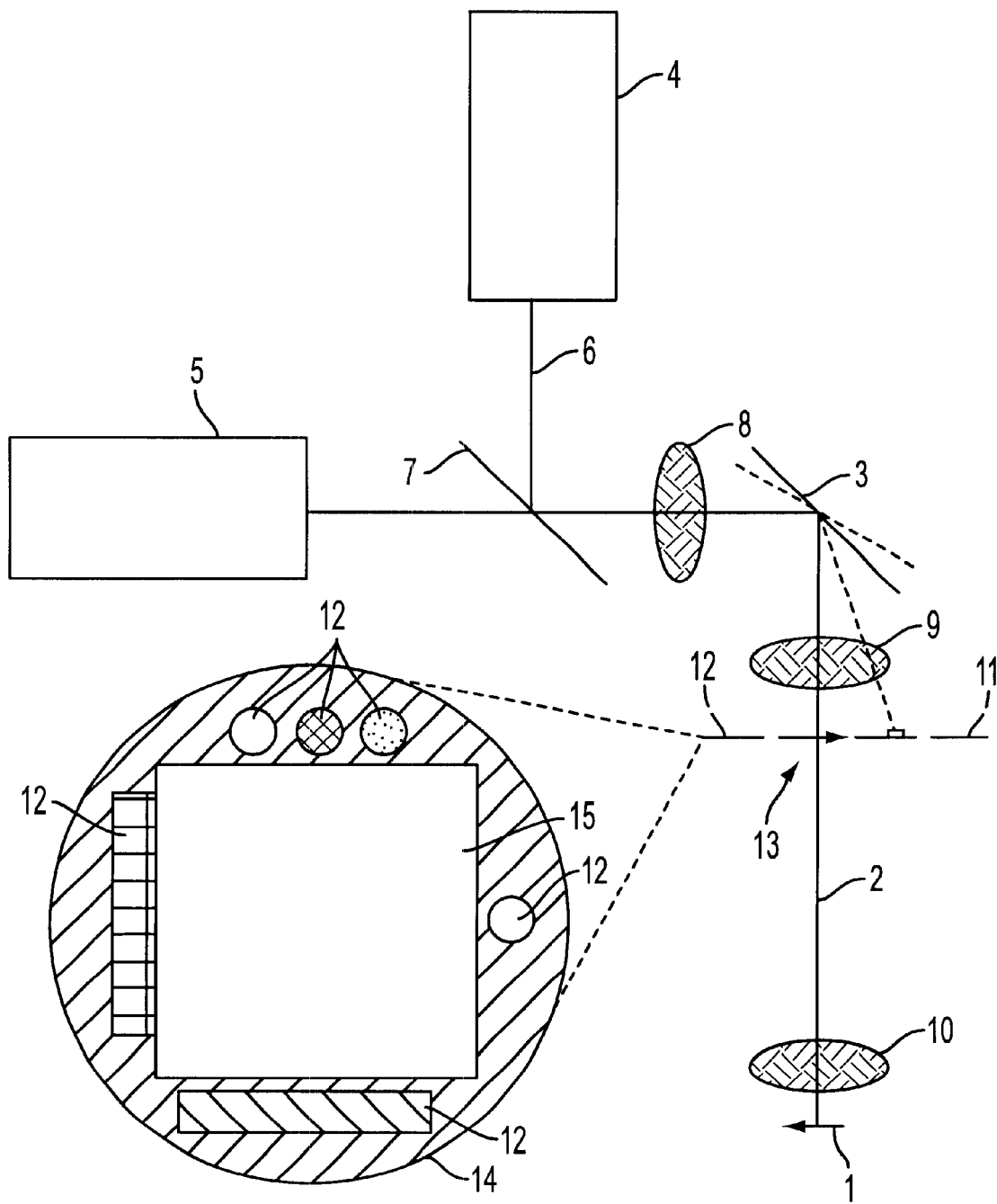

The sole figure shows a diagrammatic representation of an arrangement for calibrating a confocal laser scanning microscope, it being possible for an object 1 to be scanned by a scanning beam 2. For better comprehension of the teaching according to the invention, the figure shows not only the scanning beam 2 scanning the object 1, but the scanner 3, the laser light source 4 and the detector 5. The laser beam 6 is emitted by the light source 4, and passes via a beam splitter 7 via a suitable optical system 8 to the scanner 3. Starting from there, the scanning beam 2 is directed via an eyepiece 9 and an objective 10 to the object 1. Located between the eyepiece 9 and the objective 10 is an intermediate image 11, in the plane of which the calibration means 12 are arranged.

In the exemplary embodiment selected here, the calibration means 12 are arranged at the edge of the intermediate image 11 outside the actual image field 13. Provided for this purpose is a calibration template 14 which has a cutout 15 corresponding to the size of the image field 13. The calibration means 12 are arranged at the edge of the calibration template 14, different symbols diagrammatically indicating here different calibration means 12. With regard to the calibration means 12—measuring means and reference structures—coming into consideration, reference may be made to the general part of the description in order to avoid repetitions. In any case, it is essential that the calibration means 12 can be passive or active calibration means 12, it being possible for the passive calibration means 12 to be of flat or three-dimensional construction.

Reference may be made to the general part of the description with regard to further advantageous refinements, for the purpose of avoiding repetitions.

LIST OF REFERENCE NUMERALS

1 Object
2 Scanning beam
3 Scanner
4 Laser light source
5 Detector
6 Laser beam
7 Beam splitter
8 Optical system
9 Eyepiece
10 Objective
11 Intermediate image
12 Calibration means
13 Image field
14 Calibration template 15 Recess in the calibration template

What is claimed is:

1. An arrangement for calibrating a confocal laser scanning microscope, comprising an object (1) to be scanned by a scanning beam (2), defined by calibration means (12) which are arranged in a plane defined by an intermediate image (11) and can likewise be scanned by the scanning beam (2).

2. The arrangement as claimed in claim 1, wherein the calibration means (12) can be pivoted into the region of the image field (13) in the plane of the intermediate image (11).

3. The arrangement as claimed in claim 1, wherein the intermediate image is enclosed by a predetermined geometric form and wherein the calibration means (12) are arranged outside an edge of the intermediate image (11) outside an actual image field (13).

4. The arrangement as claimed claim 1, wherein the calibration means (12) comprise measuring means capable of providing a parameter of said confocal laser scanning microscope to be measured.

5. The arrangement as claimed in claim 4, wherein the measuring means comprise a detector for measuring laser power and laser calibration.

6. The arrangement as claimed in claim 5, wherein the detector comprises photodiodes.

7. The arrangement as claimed in claim 1, wherein the calibration means (12) are reference structures.

8. The arrangement as claimed in claim 7, wherein the reference structures comprise gratings for calibrating image size and/or calibrating linearity.

9. The arrangement as claimed in claim 7, wherein the reference structures comprise lines for calibrating image position.

10. The arrangement as claimed in claim 7, wherein the reference structures comprise flat patterns for calibrating a phase of outward and return movements of a scanner (3) that scans the scanning beam.

11. The arrangement as claimed in claim 7, wherein the reference structures comprise 3-D structures for calibrating an optical system of the confocal laser scanning microscope that includes a pinhole position.

12. The arrangement as claimed in claim 11, wherein the 3-D structures are steps, recesses or the like.

13. The arrangement as claimed in claim 7, wherein the reference structures comprise luminous means for calibrating a detector (5) of the confocal laser scanning microscope.

14. The arrangement as claimed in claim 13, wherein the luminous means cover different spectra.

15. The arrangement as claimed in claim 13, wherein the luminous means are light-emitting diodes.

16. The arrangement as claimed in claim 7, wherein the reference structures are designed as means exhibiting interactions with the scanning beam (2).

17. The arrangement as claimed in claim 16, wherein the means exhibiting interactions with the scanning beam (2) include known reflecting, absorbing, fluorescing or polarizing properties.

18. The arrangement as claimed in claim 1, wherein the calibration means (12) are arranged in matrix form.

19. The arrangement as claimed in claim 1, wherein the calibration means (12) are arranged in meandering form.

20. (Twice Amended) The arrangement as claimed in claim 1, wherein the calibration means (12) are arranged and/or constructed on a calibration template (14).

21. The arrangement as claimed in claim 20, wherein the calibration template (14) is a precision board with etched structures.

22. The arrangement as claimed in claim 21, wherein the board is designed as a preferably gilded epoxy resin plate.

23. The arrangement as claimed in claim 20, wherein the calibration template (14) has a cutout (15) corresponding to the size of the image field (13).

24. The arrangement as claimed in claim 20, wherein the calibration template (14) comprises a preferably stationary circular ring surface carrying the calibration means (12).

25. The arrangement as claimed in claim 20, wherein the calibration template (14) is designed as a disk which can be swiveled into the beam path of the scanning beam (2).

26. An arrangement for calibrating a confocal laser scanning microscope, comprising:
    a scanning beam to scan an object; and
    a calibration structure disposed in a plane defined by an intermediate image, wherein the calibration structure is scanable by the scanning beam.

27. The arrangement as claimed in claim 26, wherein the intermediate image is enclosed by a predetermined geometric form and wherein the calibration structure is disposed outside an edge of the intermediate image, outside an actual image field.

28. A method for calibrating a confocal laser scanning microscope, comprising:
    scanning an object with a scanning beam; and
    arranging calibration means in a plane defined by an intermediate image of the object, wherein the calibration means are scannable by the scanning beam.

29. The method as claimed in claim 28, wherein the calibration means (12) are scanned at an outside edge of the intermediate image (11) outside an actual image field (13), wherein the intermediate image is enclosed by a predetermined geometric form and wherein the calibration means (12) are arranged at the outside edge of the intermediate image (11) outside the actual image field (13).

30. The method as claimed in claim 28, further comprising calibrating the confocal laser scanning microscope directly after switching on a laser light source (4).

31. The method as claimed in claim 28, further comprising calibrating the confocal laser scanning microscope before and/or after scanning the object or recording the image.

32. The method as claimed in claim 28, further comprising manually initiating a calibration of the confocal laser scanning microscope.

33. The method as claimed in claim 28, further comprising automatically initiating a calibration of the confocal laser scanning microscope.

34. The method as claimed in claim 28, further comprising automatically correcting data obtained by calibrating the confocal laser scanning microscope.

35. A calibration unit for a confocal laser scanning microscope comprising:
    a calibration template which includes
        a cutout, wherein the cutout corresponds to the size of an image field defined by the confocal laser scanning microscope, and
        a plurality of calibration structures arranged on the calibration template around the cutout.

36. The calibration unit as claimed in claim 35, wherein the calibration structures comprise gratings for calibrating image size and/or calibrating linearity.

37. The calibration unit as claimed in claim 35, wherein the calibration structures comprise lines for calibrating image position.

38. The calibration unit as claimed in claim 35, wherein the calibration structures comprise flat patterns for calibrating a phase of outward and return movements of a scanner that scans a scanning beam.

39. The calibration unit as claimed in claim 35, wherein the calibration structures comprise 3-D structures for calibrating an optical system that includes a pinhole position.

40. The calibration unit as claimed in claim 39, wherein the 3-D structures include steps or recesses.

41. The calibration unit as claimed in claim 35, wherein the calibration structures comprise structure that exhibit interactions with a scanning beam of the confocal laser scanning microscope.

42. The calibration unit as claimed in claim 41, wherein the structures which exhibit interactions with the scanning beam have known reflecting, absorbing, fluorescing or polarizing properties.

43. The calibration unit as claimed in claim 35, wherein the calibration structures are arranged in matrix form.

44. The calibration unit as claimed in claim 35, wherein the calibration structures are arranged in meandering form.

45. The calibration unit as claimed in claim 35, wherein the calibration template comprises a precision board with etched structures.

46. The calibration unit as claimed in claim 45, wherein the board comprises a gilded epoxy resin plate.

47. The calibration unit as claimed in claim 35, wherein the calibration template comprises a stationary circular ring surface carrying the calibration structures.

48. A calibration unit for calibrating a confocal laser scanning microscope that scans an object (1) with a scanning beam (2), comprising:
   a calibration template that includes a plurality of calibration structures, wherein the calibration template is disposed proximate to the object, wherein the calibration template can be scanned by the scanning beam.

49. The calibration unit as claimed in claim 48, wherein the calibration template is arranged directly on or in front of the object to be scanned.

* * * * *